United States Patent [19]
Soelberg

[11] 3,833,755

[45] Sept. 3, 1974

[54] EASILY STRIPPABLE RIBBON CABLES

[75] Inventor: R. Keith Soelberg, Flagstaff, Ariz.

[73] Assignee: W. L. Gore & Associates, Inc., Newark, Del.

[22] Filed: Aug. 16, 1973

[21] Appl. No.: 388,798

[52] U.S. Cl. .................. 174/117 F, 156/52, 156/55
[51] Int. Cl. ............................................. H01b 7/08
[58] Field of Search....... 174/117 R, 117 F, 117 FF; 156/51, 55, 52

[56] References Cited
UNITED STATES PATENTS

| | | | |
|---|---|---|---|
| 2,791,624 | 5/1957 | Kigler | 174/117 F |
| 3,082,292 | 3/1963 | Gore | 174/117 F |
| 3,226,473 | 12/1965 | Dahlgren | 174/117 FF |
| 3,547,718 | 12/1970 | Gordon | 156/55 |
| 3,736,366 | 5/1973 | Wittenberg | 174/117 F |

*Primary Examiner*—E. A. Goldberg
*Attorney, Agent, or Firm*—Ernest A. Uebler

[57] ABSTRACT

Continuous lengths of flat electrical cable have segments of the cable easily strippable for termination purposes. Flat multiconductor cable may be produced by laminating conductors between sheets or ribbons of plastic insulation material. Easily strippable segments of such a cable may be made by interrupting the laminations in the insulating sheets at periodic intervals. The insulating material which has not been laminated may subsequently be cut transversely just prior to end-use application, and pulled away from all conductors simultaneously, thereby exposing all conductors for termination.

16 Claims, 7 Drawing Figures

EASILY STRIPPABLE RIBBON CABLES

BACKGROUND OF THE INVENTION

1. Field of the Invention

This invention relates to multiconductor flat electrical cables having insulating material composed of various kinds of polymeric materials. More particularly, it relates to a construction of such cable which is provided with sections along the length of the cable arranged at desired intervals, in which sections the polymeric insulation may be easily stripped from the conductors, thereby exposing all conductors simultaneously for termination purposes.

Multiconductor, flat, electrical cables having insulating material composed of polymeric substance (hereinafter "ribbon cables") are used extensively in applications requiring low weight and low volume per cable foot, flexibility, and dependable, precise electrical characteristics. Applications for ribbon cable are found in computers, in aircraft and spacecraft, in business machines, and in similar applications.

Ribbon cables can be manufactured by laminating sheets of insulation material together, with a plurality of parallel conductors positioned as desired between the sheets and encapsulated by the sheets. Suitable insulating sheets may be polytetrafluoroethylene, fluorinated ethylene propylene, and other fluorocarbon polymers, polyesters, polyamides, polyimides, polyurethanes, polyvinylchloride, polyolefins, and other similar materials.

The conductors which are interposed between the sheets of insulation to make ribbon cable may be either round or flat bare wire conductors. Alternatively, these conductors may be insulated with a desired primary insulation prior to encapsulation between the sheets to form ribbon cable. The conductors may be spaced at equidistant intervals from each other, or at any desired spacing. One configuration provides ribbon cable in which the conductors are round wires insulated with a primary insulation, and pairs of these insulated conductors are twisted together, and a plurality of these twisted pairs are then laminated at some desired spacing, between sheets of insulation as discussed previously.

Stripping of the insulation from ribbon cables for termination purposes is difficult when the conductors are not precisely spaced apart from one another. When the conductors are not precisely aligned, mechanical stripping devices may cut through the conductors, and the stripping must then be attempted again. Often the stripping must be accomplished by hand. This problem is most serious when ribbon cables having non-parallel conductor configurations, such as twisted pairs must be stripped, since the random orientation of the twisted pairs prevents precise alignment.

2. Description of the Prior Art

Ribbon cables having a plurality of parallel conductors interposed and bonded between sheets of insulating material are well known. Ribbon cables having conductor wires insulated with a primary insulation, and twisted together in pairs, and a plurality of these twisted pairs interposed between sheets of insulating material, which sheets are bonded together, are also known.

Methods for making ribbon cables vary with different kinds of insulation materials. One method is to place an adhesive material between the sheets adjacent to the conductors. Another method is to heat sheets of thermoplastic insulation material to their softening point until they become tacky, then place aligned conductors between the sheets followed by compression of the sheets to bond them together and encapsulate the conductors.

One method which is particularly useful for making ribbon cables insulated with polytetrafluoroethylene (hereafter "PTFE") is described in U.S. Pat. No. 3,082,292. By this method two sheets of extruded unsintered PTFE or other fluorocarbon polymer are guided to the nip of two pressure rollers. Conductor wires are also guided to the nip between the insulating sheets. During compression upon passage through the rollers the PTFE sheets encapsulate the wires and the pressure of the rollers bonds the PTFE sheets together in the space between the aligned conductors, to form the PTFE-insulated ribbon cable.

Similar methods may be employed to make ribbon cables using conductors of round wire, wire which is flat, or wire which is covered by a primary insulation.

By all of these methods bonding occurs between the sheets of insulating material between the conductor wires and extends the entire length of the cable. Because of this bonding, and because of misalignment of conductors, stripping of the sheet insulation from these ribbon cables, for termination purposes, is difficult when the time comes to install the cables in end use applications. This problem becomes acute when the conductors are twisted pairs of primary-insulated wires.

SUMMARY OF THE INVENTION

This invention is useful in that it provides continuous lengths of ribbon cables having segments located periodically along the length of the cable, in which segments the sheets of insulation are not bonded together, and in which segments the insulating material may be easily stripped from the conductors. In one embodiment, the delaminated segments extend over the entire width of the cable. In another embodiment, the delamination in these segments does not extend over the entire width of the cable, but only over the center portion, so that the edges of the cable remain bonded and sealed.

Stripping of the polymeric insulation from all of the conductors simultaneously may be accomplished, according to the invention, quite simply. In those segments of the cable where the insulating sheets are not bonded together, the cable may be cut transversely and the insulation may be slit in this non-bonded region along the longitudinal axis of the cable, and the tabs so formed may be pulled back to remove the insulation jacket completely, exposing all the conductors in one step.

As discussed previously, the delaminated segments of cable which are arranged in periodic sequence along the length of the cable may extend over the entire width of the cable or they may extend only over the center portion of the cable, leaving the edges sealed. These delaminated segments may range from fractions of an inch in length to several inches in length. Longitudinal spacing between the delaminated segments may range from fractions of an inch to several feet.

The method of making the easily strippable ribbon cables of this invention involves use of a double roll system such as is often used conventionally in making continuous lengths of ribbon cable. By conventional methods, at least two sheets of insulation material are guided to the nip of two rollers, and conductor wires, either bare or having primary insulation, and either single conductors or twisted pairs or some similar arrangement are guided to the nip between the sheets at some desired spacing. One or both of the sheets of insulation may have an adhesive applied to the surface which contacts the other sheet upon passage through the rolls, and thus bonds the sheets together to encapsulate the conductors. Or the rolls may be heated in order to bring the insulation sheets to the temperature at which the sheets become tacky. Upon passage through the rolls the tacky sheets bond together around the conductors. A variation on this method includes the use of a first set of heated rollers or other heating devices to pre-heat the sheets, followed by a second set of bonding rollers.

When PTFE is the material used for insulating sheets, the two sheets and conductors interposed between are brought to and through the nip of two unheated pressure rollers which compress the sheets about the conductors, thereby encapsulating the conductors and forming a ribbon cable upon exit from the rollers.

According to this invention, a groove or depression is machined into the surface of one or both of the rollers used to bond the insulation sheets together about the conductors by any of the methods described previously. This depression may be any desired shape, but it is typically rectangular, with its long axis parallel to the axis of the roller. The length of this depression may be longer than the width of the insulating sheets. In such case, when the depression reaches the nip of the rollers, no pressure is applied to the insulating sheets due to the presence of the depression. When the roller moves further so that the depression is outside the nip, bonding again occurs. The cable which is thus produced has alternating bonded and non-bonded segments located periodically along its entire length, the non-bonded segments extending across the entire width of cable.

Alternatively, the length of the machined depression may be less than the width of the insulating sheets, in which case those segments of cable which are not bonded together do not extend across the entire width of the cable formed, but rather the edges of the cable are bonded along the entire length of the cable, thus providing an environmental seal throughout the cable length.

It is clear that the shape and dimensions of the non-bonded, easily strippable portions of ribbon cable of this invention depend upon the dimensions of the depression and the dimensions of the rollers used.

DESCRIPTION OF THE DRAWINGS

This invention may be further understood by reference to the drawings. The description below is not intended to be limitative, but is given for illustrative purposes.

As seen in FIG. 1, insulating sheets (or "tapes," or "ribbons") 14 and 15 are guided into the nip between rollers 10 and 11 Rollers 10 and 11 rotate cooperatively so as to tend to pull these tapes to and through the nip between the rollers.

Figure 1:
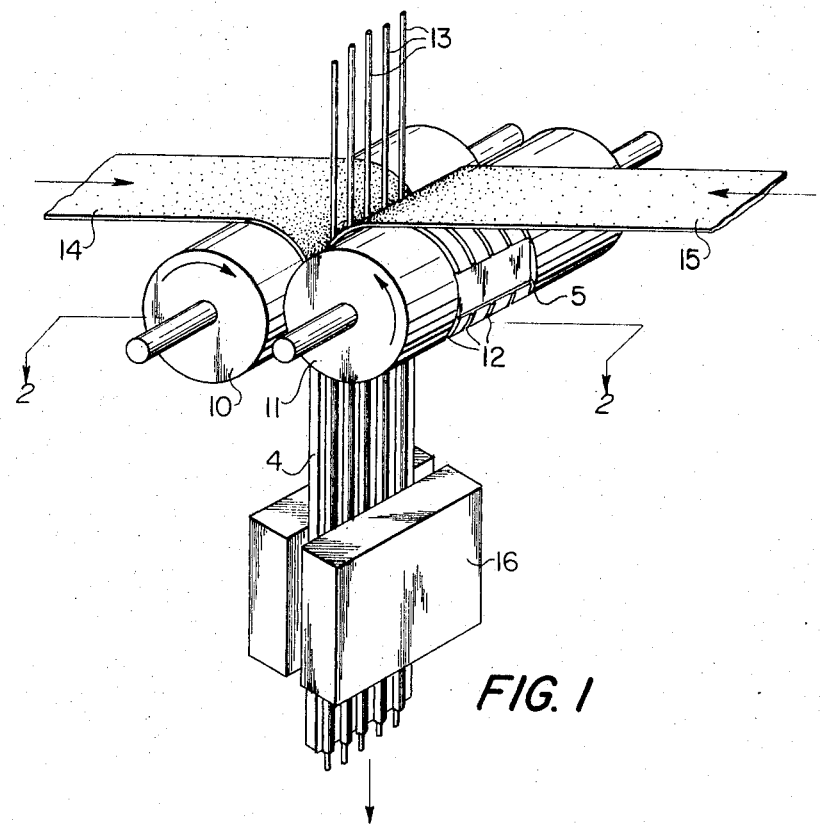
FIG. 1 is a schematic view of the process and apparatus of this invention.

Conductor wires 13 are also guided into the nip between rollers 10 and 11 and between the insulating sheets 14 and 15 in some desired alignment as shown.

Rollers 10 and 11 are shown having a plurality of grooves 12 running circumferentially about them. These grooves are aligned with the conductors 13, and are machined into the rollers such that their cross-sectional shape corresponds approximately to the cross-section of half the conductor overlayed by the insulating sheets being used. For essentially incompressible insulating sheets, such grooved rolls are necessary. For compressible or deformable insulating sheets, the rollers 10 and 11 may be so grooved, but flat-surface rollers may also be used.

A depression 5 is shown machined into the surface of roller 11. A similar depression may also be employed in roller 10, designed to act cooperatively with the depression 5 in roller 11.

Rollers 10 and 11 may be heated rollers if needed for the particular insulating sheets being used. Heating means are not shown for convenience.

Ribbon cable 4, having conductors 13 encapsulated by insulating sheets 14 and 15, is shown exiting from the rollers, and through optional oven 16. Oven 16 may be employed when it is desired to heat-set an adhesive or to fuse the insulating sheets, or for any reason it is desirable to heat the ribbon cable.

Figure 2:
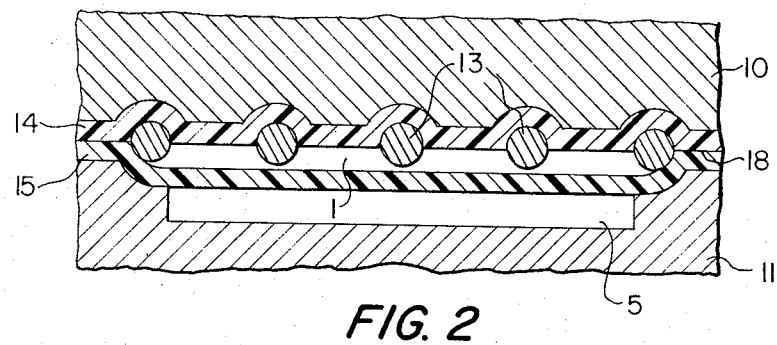
FIG. 2 is a cross-sectional detail of the nip between the rollers at an instant when the depression in one roller is adjacent to one of the insulating sheets.

FIG. 2 shows, in cross-section, the nip between rollers 10 and 11 at an instant when depression 5 is adjacent to an insulating tape 15. Five conductors 13 are shown for convenience, but essentially any number may be employed. Depression 5 is shown not extending to the outside edges of the ribbon cable, but as an alternative to the configuration shown, depression 5 could extend the entire width of the cable. However, as shown, the edges of the ribbon cable are bonded at the interface 18 between insulation sheets 14 and 15, and are not bonded in region 1 adjacent to depression 5.

Figure 3:
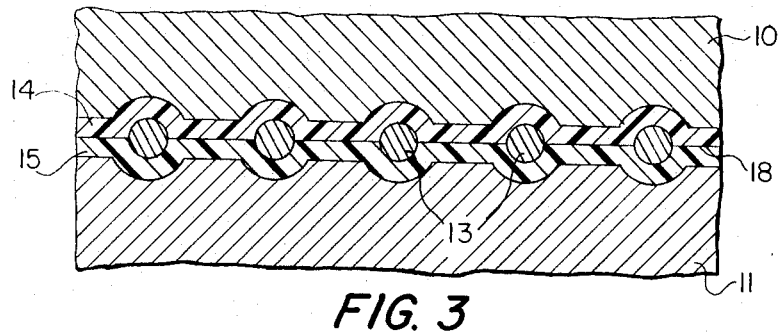
FIG. 3 is a cross-sectional detail of the nip between the rollers at an instant when no depressions in either roller are adjacent to either insulating sheet.

FIG. 3 shows, in cross-section, the nip between rollers 10 and 11 at an instant when depression 5 is not adjacent to either of insulating tapes 14 and 15. At this instant, bonding 18 occurs across the entire width of cable.

Figure 4:
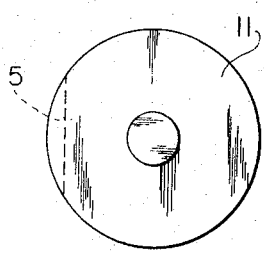
FIG. 4 is an end view of one roller showing the depression as a machined flat spot.

FIG. 4 shows, in end detail, one roller 11 with depression 5 machined as a flat into the roller surface.

Figure 5:
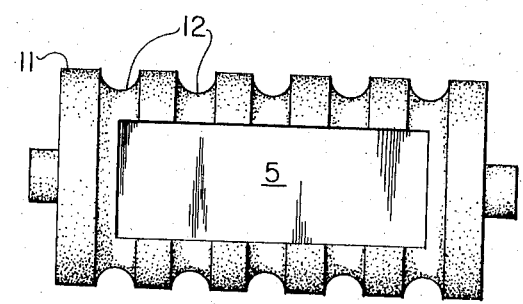
FIG. 5 is a front view of one roller showing the depression as a machined flat spot.

FIG. 5 shows, in front detail, roller 11 with depression 5 machined as a flat into the roller surface.

Figure 6:
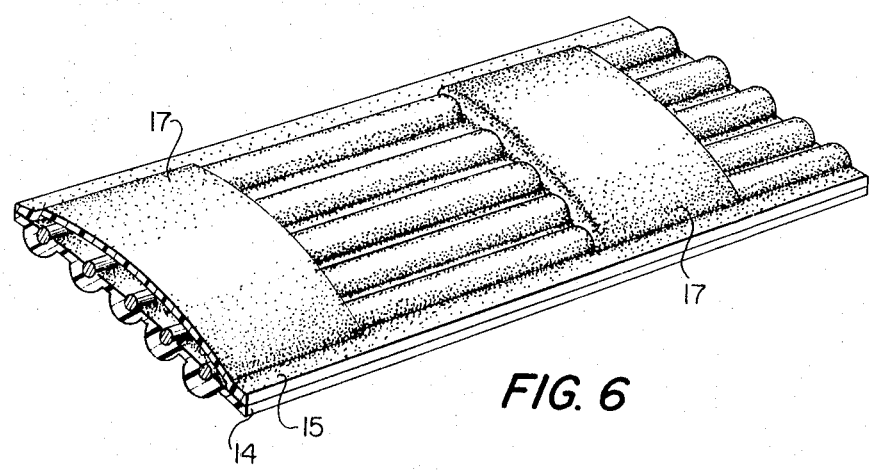
FIG. 6 is a schematic view of a section of the ribbon cable of this invention showing the non-bonded, easily strippable segments.

FIG. 6 is a schematic view of a length of cable of this invention showing the alternating bonded and non-bonded segments. Insulating sheets 14 and 15 are shown to be encapsulating conductors 13 and to be bonded to each other except in non-bonded segments 17. Non-bonded region 1 is shown exposed where the cable length has been cut transversely through a segment 17.

Figure 7:
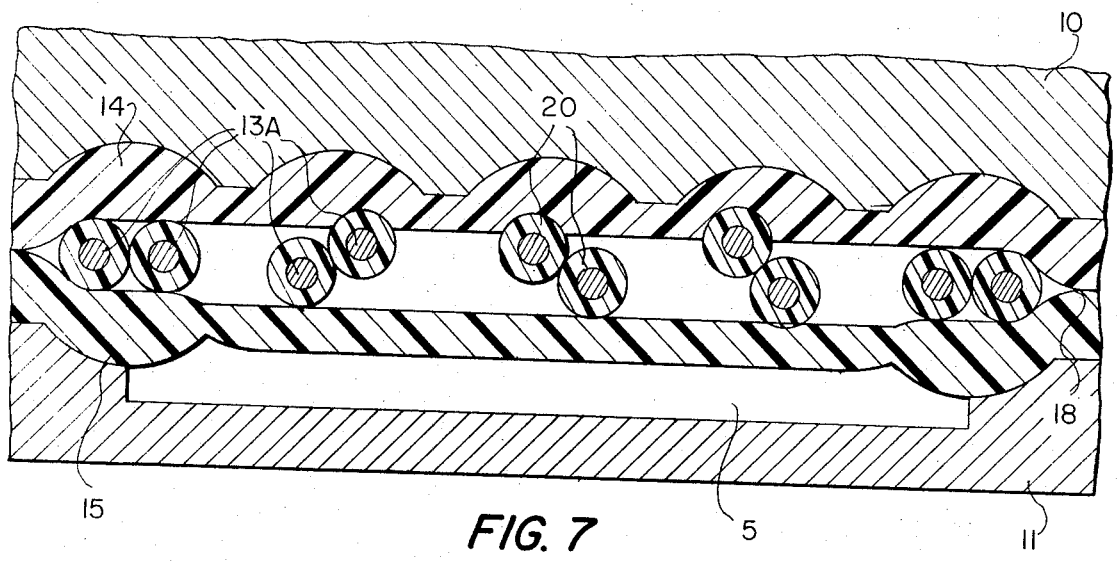
FIG. 7 is a cross-sectional detail of the nip between the rollers at an instant when the depression in one roller is adjacent to one of the insulating sheets, for cable employing conductors comprised of twisted pairs of primary-insulated wires.

FIG. 7 shows, in cross-section, the nip between rollers 10 and 11 at an instant when depression 5 is adjacent to an insulating tape 15, when the conductors are twisted pairs of wires 13A insulated with primary insulation 20. Again depression 5 is shown not to extend to the cable edges, thereby providing an edge bond 18, and seal.

DESCRIPTION OF A PREFERRED EMBODIMENT

The preferred embodiment of this invention comprises guiding two tapes of extruded, unsintered polytetrafluoroethylene to the nip between rollers of a two-roll system as shown in FIG. 1. The rollers are unheated.

Twisted pairs of conductor wires insulated with a polymeric insulating material are guided to the nip between the rollers and between the PTFE tapes.

One of the rollers has a depression in its surface, put there by machining a flat on the roll surface. The length of the depression in the direction of the axis of the rollers is less than the width of the PTFE tapes, and the tapes are guided so that their edges overlap the depression as the roller turns.

As the tapes and conductors are fed to and through the nip between the rollers, the rollers compress the tapes about the conductors, and the tapes bond together at their points of contact between conductors and at the outside edges of the tapes, during the time when the depression in the roller is not adjacent to one of the tapes. During passage of the depression through the nip, the compressive force on the tapes is relieved, and no bonding occurs.

Thus, cable is made having alternating bonded and non-bonded insulation segments over the length of the cable, with both edges of the cable being bonded and sealed along the entire cable length.

The cable is then passed through an oven to fuse the tapes of insulation together at the bonded interfaces and sinter the PTFE insulation.

EXAMPLE

Two tapes of extruded, unsintered PTFE having a width of 2.125 inches and a thickness of 0.006 inches were guided to the nip between two unheated rollers as shown in FIG. 1. The rollers were 6 inches in length and four inches in diameter, and contained grooves spaced approximately 0.135 inches apart, which grooves were semi-circular in cross-section having a radius of 0.038 inches. The land length between the grooves was 0.025 inches.

Twelve twisted pairs of AWG 26 stranded wire having a primary insulation of PTFE with wall thickness 0.006 inch were guided to the nip between the rollers, each pair being guided adjacent to a groove in the rollers, between the insulating tapes.

The distance between the rollers at their closest point in the nip was 0.004 inches.

One roller had a milled flat spot on its surface, which flat spot was rectangular in shape having a dimension in the direction of the roller axis of 1.62 inches and a dimension in the direction perpendicular to the roller axis of 1.00 inches.

The tapes and conductors were fed to and through the nip of the rollers as described, and a ribbon cable was made having alternating bonded and non-bonded insulation segments over the length of the cable, with both edges of the cable being bonded and sealed along the entire cable length.

This cable was then passed through an oven maintained at 390° C, and the insulating sheets were fused ("sintered").

A portion of this cable was cut transversely in one of the non-bonded segments, then one of the insulating sheets was slit between two of the conductors and the tabs so formed were pulled away exposing all conductors simultaneously.

The invention disclosed herein has been described with reference to certain preferred embodiments and certain operability requirements. These embodiments and requirements are illustrative only, and it is clear that changes, modifications, or equivalents may be used. Such changes, modifications and equivalents fall within the scope of the claims below.

I claim:

1. An easily strippable, flat carbon cable for transmission of electricity, comprising:
    a. A multiplicity of elongated electrical conductors insulated with a continuous coating of a primary insulation,
    b. at least two elongated sheets of polymeric electrical insulating material enclosing said multiplicity of insulated conductors, forming a multi-conductor cable,
    c. said sheets being alternately bonded together in a first longitudinal segment of cable and not bonded together in a second longitudinal segment of cable located adjacent longitudinally to said bonded segment,
    d. said bonded and non-bonded segments alternating periodically along the entire length of said cable.

2. The cable of claim 1 in which at least two of said elongated electrical conductors insulated with primary insulation are twisted together to form a twisted pair, and at least one of said twisted pairs are interposed between said insulating sheets.

3. The cable of claim 1 in which said sheets are polytetrafluoroethylene.

4. The cable of claim 1 in which said sheets are polyester.

5. The cable of claim 1 in which said sheets are polyamide.

6. The cable of claim 1 in which said sheets are polyimide.

7. The cable of claim 1 in which said sheets are polyurethane.

8. The cable of claim 1 in which said sheets are polyvinylchloride.

9. The cable of claim 1 in which said sheets are polyolefin.

10. The cable of claim 1 in which said sheets are fluoronated ethylene propylene.

11. A ribbon cable in accordance with claim 1, the non-bonded segments extending across the entire width of said cable.

12. A ribbon cable in accordance with claim 1, the non-bonded segments of said insulating sheets extending outwardly from the centerline of said cable toward the edges of said cable but not extending to the edges of said cable, said insulating sheets being bonded together for a distance inward from the cable edges along the entire length of said cable.

13. A process for making an easily strippable, flat ribbon cable for the transmission of electricity, which process comprises:
   a. interposing at least one elongated electrical conductor between a pair of elongated sheets of electrical insulating material to form a bondable assembly,
   b. passing said bondable assembly through the nip formed between two pressure rollers, at least one of which rollers has a depression in its surface,
   c. thereby bonding said sheets with conductors between where they contact each other in passage through said rolls, but forming no bond between said sheets where said depression is adjacent one of said sheets and relieves the bonding pressure.

14. The method of claim 13 wherein said bonding is accomplished by introducing an adhesive between the sheets of insulating material.

15. The method of claim 13 wherein said bonding is accomplished by raising the temperature of said insulating sheets, at their respective surfaces of contact, to the point where said sheets become tacky.

16. The method of claim 13 wherein said sheets are unsintered polytetrafluoroethylene and said bonding is accomplished by laminating said assembly with the pressure rollers operating to compress said sheets.

* * * * *

UNITED STATES PATENT OFFICE
CERTIFICATE OF CORRECTION

Patent No. 3,833,755　　　　　　　Dated September 3, 1974

Inventor(s) R. Keith Soelberg

It is certified that error appears in the above-identified patent and that said Letters Patent are hereby corrected as shown below:

In column 6, line 25, in the first line of Claim 1, the word "carbon" should read --ribbon--.

Signed and sealed this 18th day of February 1975.

(SEAL)
Attest:

RUTH C. MASON
Attesting Officer

C. MARSHALL DANN
Commissioner of Patents
and Trademarks